Figure 1:
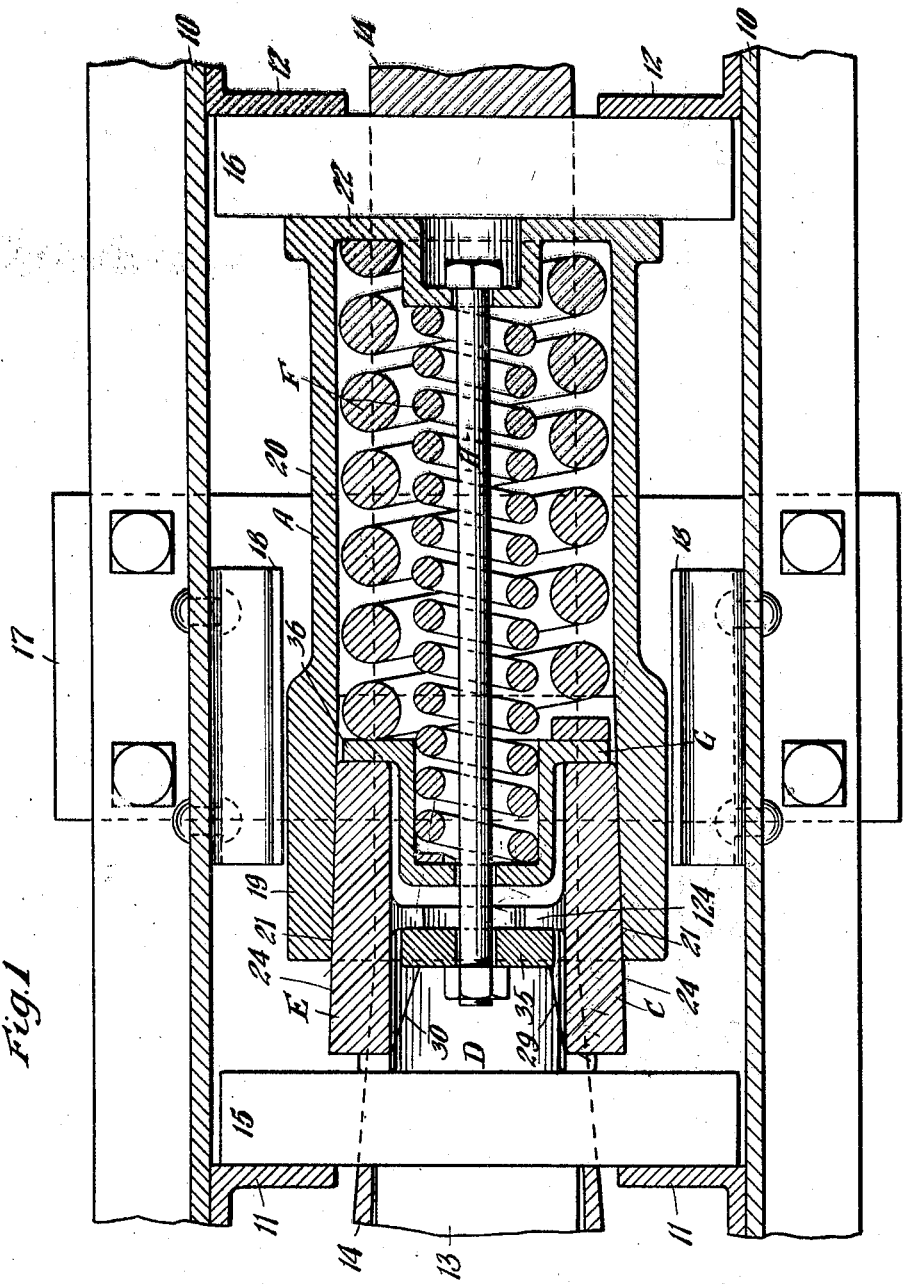

March 9, 1926. 1,575,709
J. F. O'CONNOR
FRICTION SHOCK ABSORBING MECHANISM
Filed May 7, 1923 2 Sheets-Sheet 1

Witnesses
Wm. Geiger

Inventor
John F. O'Connor
By George I. Haight
Atty.

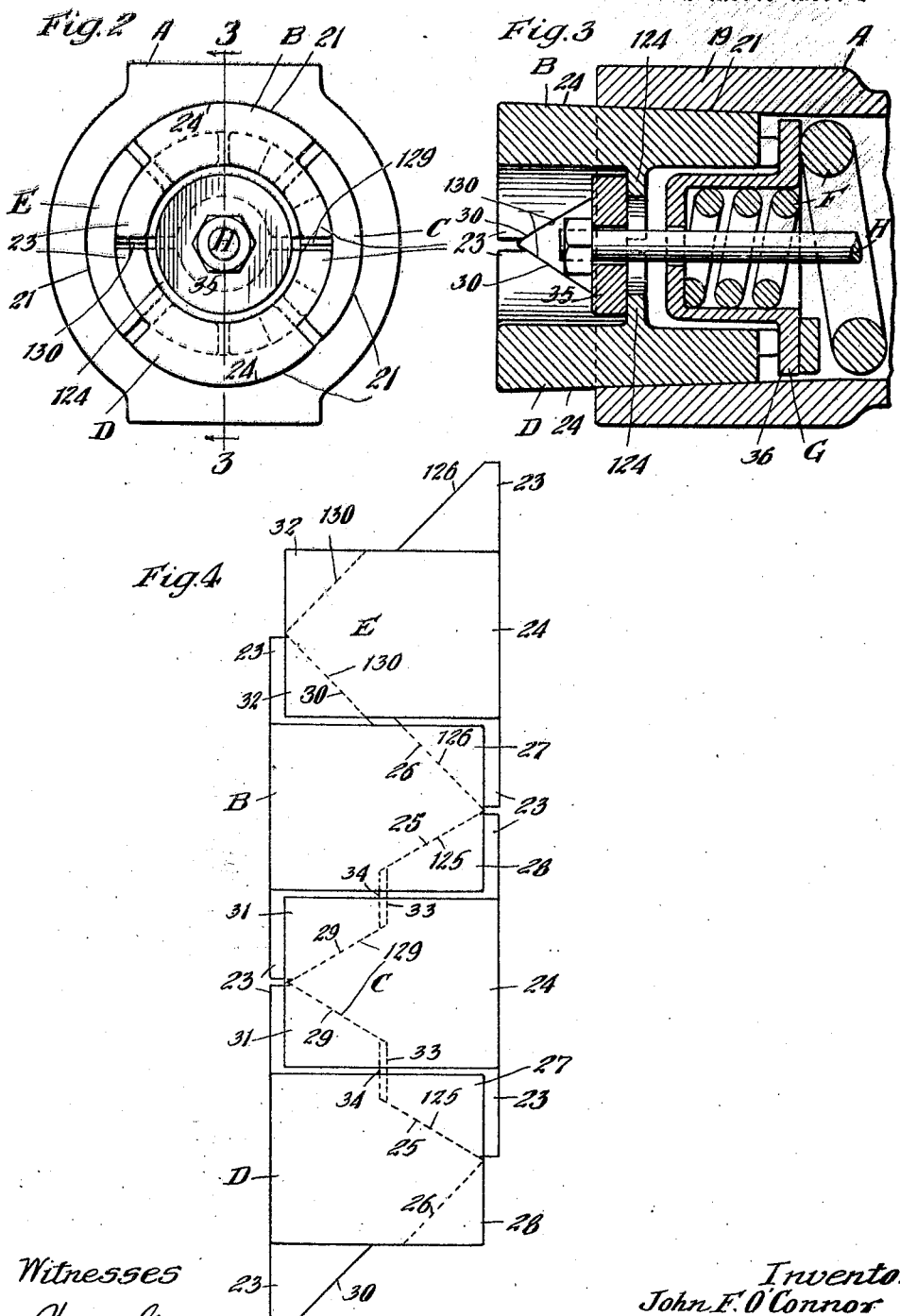

Patented Mar. 9, 1926.

1,575,709

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 7, 1923. Serial No. 637,168.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to friction shock absorbing mechanisms.

One object of the invention is to provide a friction shock absorbing mechanism, especially adapted for railway draft riggings and wherein are obtained high capacity and certain and easy release.

More specifically, an object of the invention is to provide a mechanism of the character indicated, having a plurality of friction elements which possess and combine the characteristics of both friction shoes and wedges proper, and wherein said elements are so formed and arranged as to produce a keen wedging effect, a blunt releasing effect, and a "safety valve" feature to prevent injury to the parts.

Other objects and advantages of the invention will more clearly appear from the description and claims hereinafter following.

In the drawings forming a part of this specification, Figure 1 is a horizontal, longitudinal, sectional view of a portion of a railway draft rigging, showing my improvements in connection therewith. Fig. 2 is a front elevational view of the friction shock absorbing mechanism proper. Fig. 3 is a vertical, transverse, sectional view of the friction shock absorbing mechanism proper corresponding to the line 3—3 of Fig. 2. And Fig. 4 is a diagrammatic plan view of a development of the combined friction shoes and wedges, looking at the outer side of the same.

In said drawings 10—10, denote the usual draft sills of a car under-frame, to the inner faces of which are secured front stop lugs 11 and rear stop lugs 12. The inner end portion of the draw-bar is indicated at 13, the same being operatively associated with the shock absorbing mechanism proper by a hooded cast yoke 14, within which are disposed the shock absorbing mechanism and the front and rear followers 15 and 16. The yoke and parts therein are supported in operative position by a detachable saddle plate 17. The mechanism is of that character employing a combined shell and spring cage of cylindrical form throughout and in order to maintain it in a central position, the inner faces of the draft sills have secured thereto, guide plates 18—18.

The friction shock absorbing mechanism as shown, comprises broadly, a combined friction shell and spring cage casting A; an annular series of four combined friction shoes and wedge elements B, C, D and E; a spring resistance F; a spring follower cap G; and a retainer bolt H.

The casting A is of substantially cylindrical form throughout its length, with the friction shell 19 formed at its front end and the springs cage proper 20 rearwardly thereof. The interior of the shell 19 is formed with four independent cylindrical friction surfaces 21, each extending through an arc of approximately 90°, said cylindrical surfaces converging inwardly of the shell and extending at comparatively acute angles with respect to the axis of the mechanism. The casting A has the spring cage portion 20 thereof formed with a transverse rear wall 22 adapted to co-act with the rear follower 16.

As shown, I employ four combined friction shoes and wedge elements B, C, D and E, of like construction, two of them extending in one direction and the other two in the opposite direction, and alternated as clearly shown in Figs. 2 and 4. Each of the combined friction shoes and wedge elements is provided with a pair of oppositely extending, annular wing portions 23 offset inwardly with reference to the main portion of the element and arranged in circular alinement, and an outer cylindrical friction surface 24 corresponding in curvature to and co-acting with one of the cylindrical friction surfaces 21 of the shell. The elements B and D are also provided with inwardly projecting, transverse, central, annular flange 124, for a purpose hereinafter described. Each of the elements B and D is cut away at the inner end thereof to provide wedge faces 25 and 26 and flanges 27 and 28 respectively, and the wing portions 23 thereof are formed with transversely extending outer wedge faces 29 and 30. The faces 25 and 29 of the elements B and D coincide with helical surfaces inclined at relatively keen angles with references to the longitudinal axis of the mechanism, and the faces 26 and 30 are also helical, but extend at a relatively blunt angle with reference to the axis of the mechanism. As clearly shown in Figures 2 and 4, the flanges 27 and 28 of the elements B and D are adapted to be overlapped by wings 23 of the elements C and E.

The element C is cut away on the inner side thereof, to provide converging wedge faces 129, and annular flanges 31 at the front end, and the wings 23 of the element C are provided with converging edge faces 125. The faces 129 and 125 are correspondingly inclined to and co-act with the faces 29 and 25, respectively, of the elements B and D.

The element E is also cut away at the inner side of the forward end to provide converging wedge faces 130, correspondingly inclined to and co-acting with the wedge faces 30 of the elements B and D, and annular flanges 32. The wings 23 of the element E are formed with converging side edge faces 126, correspondingly inclined to and co-acting with the wedge faces 26 of the elements B and D. The flanges 31 and 32 of the elements C and E are adapted to overlap the adjacent wings 23 of the elements B and D. As clearly shown in Fig. 4, the wedge faces 125 and 129 of the element C are connected by a straight portion 33 and the wedge faces 29 and 25 of the elements B and D are connected by a straight portion 34. The straight wall portions 33 and 34 of these elements are normally spaced apart a slight distance to permit the necessary relative movement of the elements B, D and E during the wedging action, and to permit outward movement of the element E to compensate for wear of the wedge faces. The shoes B, C, D and E together form a friction unit, the elements of which are arranged in a circular series so that there are two series of wedge faces, each series including a plurality of keen wedge faces so disposed that all the faces included in each series are intersected by a single transverse plane.

The angularity of the blunt and keen wedge faces of the elements, B, C, D and E may be varied within certain limits and yet accomplish the desired result, but the same are preferably inclined 45° and 30°, respectively, with reference to a longitudinal line.

This spring resistance F preferably consists of an outer heavy coil and an inner lighter coil. The retainer bolt H extends centrally through the spring resistance F and a suitable opening in the spring cap or follower G, and has the rear end thereof anchored in the rear wall 22, and the front end thereof anchored to a disc 35 adapted to abut the outer sides of the flanges 124 on the elements B and D. The bolt H, as will be understood by those skilled in the art, is adapted to maintain the parts in assembled relation and also place the spring F under initial compression. The spring follower or cap is adapted to co-act with the front ends of the inner and outer coils of the spring resistance F, and is provided with a laterally projecting annular flange 36 adapted to co-act with the rear ends of the elements C and E.

The operation of the machanism is as follows, assuming an inward or buffing movement of the drawbar. As the latter moves inwardly, the front follower 15 will be moved therewith and pressure will be transmitted to the outermost friction elements B and D. Due to the keen wedge-acting faces of the friction elements B, C and D, there will be an immediate expansion of the same to increase the circumference of the entire unit constituted by said elements, the element C being yieldingly resisted during the initial action by the spring resistance F, through the follower or cap G.

During this action there will be substantially no relative movement between the blunt wedge-acting faces of the elements B and D and the blunt wedge-acting faces of the element E. The element E will thus be forced rearwardly relatively to the element C, thereby effecting a slight spacing between the latter and the spring follower cap G, the rearward movement of the element C being then resisted by the friction between the outer surface thereof and the friction shell; this frictional resistance being sufficiently great to assure the proper wedging action. As the friction unit, comprising the elements B, C, D and E, is forced inwardly of the shell it is obvious that friction is generated between the outer faces of these elements and the shell friction surfaces 21. It will be evident that due to the slight taper of the shell, a differential action is set up. This differential action is accommodated by reason of the blunt angle of the faces 26, 30, 126 and 130 permitting the element E to shift inwardly of the shell with respect to the elements B and D, without necessitating any relative shifting between the elements B, D and C. In other words, the co-operating sets of faces 26 and 126, and 30 and 130 act more or less as "safety valves" to prevent undue pressure being exerted on the shell, while at the same time not militating against the effective wedging action of the member C. During the compression stroke, the friction shell will necessarily be slightly expanded and energy stored up therein which, when the actuating force is reduced, immediately becomes available, due to the contraction of the shell, to slightly contract the unit comprising the elements B, C, D and E diametrically.

Upon reduction of the actuating force, the initial release will be produced, due to the contraction of the shell hereinbefore referred to, this initial action being facilitated by the relative bluntness of the co-operating faces 26, 126, 30 and 130 of the elements B, D and E. It will be evident that the two shoes B and D are at this time, with the exception of the resistance offered by the friction surfaces of the shell, free to move outwardly, due to the front follower dropping away. The contact between the shoes C and the shoes B and D is thus broken. This initial action sufficiently serves to reduce the pressure between the shoes and the shell to effect full release. Thereupon the spring resistance F is enabled to project the wedge elements B, C, D and E outwardly and restoring the same to normal position. It will be evident that the device will function equally well with a single series of blunt wedge faces and keen wedge faces, in fact, the front and rear wedge faces at the same side of each shoe really function in a manner similar to a single face and it is therefore within the invention to provide shoes each of which has a single continuous face at each side thereof extending for the entire length of the shoe.

During draft, the action of the mechanism will be the reverse of that just described, the rear follower 16 and the shell being moved relatively to the front follower 15, which is held stationary.

As hereinbefore described, the spring F will be placed under an initial compression, so that as wear occurs on the parts the elements C and E may be gradually moved forwardly to automatically compensate for wear.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with follower acting means; of a friction shell having interior, cylindrical friction surfaces said shell and follower means being relatively movable; a spring resistance; and a friction system composed of a plurality of wedge friction shoes arranged in annular series, certain of said shoes being in direct engagement with said follower means and all of said shoes engaging said shell friction surfaces, said shoes being provided with interengaging wedge faces certain of said faces extending at relatively blunt angles with reference to the longitudinal axis of said mechanism and the remaining faces extending at relatively keen angles with the reference to the said axis.

2. In a friction shock absorbing mechanism, the combination with follower acting means; of a friction shell having interior, converging, cylindrical friction surfaces; a spring resistance; and a friction system composed of an annular series of friction shoes, certain of said shoes being in direct engagement with the follower means and actuated thereby, said shoes directly engaging the remaining shoes, and all of said shoes having friction engagement with the friction surfaces of the shell, some of said shoes having wedge faces extending at relatively blunt angles with reference to the longitudinal axis of the mechanism, and additional wedge faces extending at relatively keen angles with reference to the said axis and the others of said shoes having wedge faces correspondingly inclined to and cooperating respectively with said blunt and said keen wedge faces.

3. In a friction shock absorbing mechanism, the combination with a friction shell having interior, converging, cylindrical friction faces; of a spring resistance; and an annular series of friction shoes co-acting with said shell friction surfaces, said series including a shoe having wedge faces extending at a relatively keen angle with reference to the direction of the applied actuating force, a second shoe having wedge faces extending at a relatively blunt angle with reference to the direction of the applied actuating force, and a pair of shoes co-acting with said first and second named shoes, each having a wedge face corresponding in inclination to and co-acting with one of the wedge faces of said first named shoe, and a wedge face correspondingly inclined to and co-acting with one of the wedge faces of said second named shoe.

4. In a friction shock absorbing mechanism, the combination with follower acting means; of a friction shell having interior, converging, cylindrical friction surfaces, said shell and follower means being relatively movable; of a spring resistance; and a friction system composed entirely of an annular series of friction shoes, all of said shoes having frictional engagement with shell friction surfaces, alternate shoes of said series being each provided with wedge faces extending at relatively keen angles with reference to the direction of the applied actuating force, and additional wedge faces extending at relatively blunt angles with reference to said direction, said keen and said blunt faces being adapted to co-act respectively with correspondingly inclined wedge faces on the remaining shoes of said series.

5. In a friction shock absorbing mechanism, the combination with a friction shell having interior, converging, cylindrical friction surfaces; a spring resistance; and an annular series of friction shoes co-acting with said shell friction surfaces, certain of the shoes of said series directly receiving the actuating force, said series including a shoe having keen angle wedge faces, a shoe having blunt angle wedge faces, and additional shoes having keen and blunt angle wedge faces co-acting respectively with the keen and blunt angle wedge faces of said first and second named shoes, respectively.

6. In a friction shock absorbing mechanism, the combination with a front follower; of a friction shell having interior, converging, cylindrical, friction surfaces; of a spring resistance; and an annular series of friction-shoes co-acting with said shell friction surfaces, said series including a plurality of friction shoes co-acting with the front follower and each provided with wedge faces disposed at a relatively blunt angle with reference to the direction of the applied actuating force and additional wedge faces disposed at a relatively keen angle with reference to said direction; and a plurality of friction shoes having wedge faces similarly inclined to and co-acting with said blunt and keen wedge faces.

7. In a friction shock absorbing mechanism, the combination with a front follower; of a friction shell having interior, converging, cylindrical friction surfaces; of a spring resistance; and an annular series of friction-shoes having co-acting wedge faces disposed at a blunt angle with reference to the longitudinal axis of the mechanism and co-acting wedge faces disposed at a relatively keen angle with reference to said axis, alternate shoes of said series co-acting with the front follower.

8. In a friction shock absorbing mechanism, the combination with a friction shell having interior, friction surfaces converged inwardly of the shell; of a spring resistance; and a friction unit co-operable with said shell and spring, said unit comprising a plurality of friction elements, each co-operable with a shell friction surface, said elements having also co-operating wedge faces disposed at a relatively blunt angle with reference to the direction of the applied actuating force and additional cooperating wedge faces disposed at a relatively keen angle with reference to said direction, certain of said elements being arranged to directly receive the actuating pressure and the remaining elements being arranged to be directly resisted by said spring resistance.

9. In a friction shock absorbing mechanism, the combination with a friction shell having interior, converging, friction surfaces; of a spring resistance; a friction wedge system co-operating with the shell, said system being composed of a plurality of elements, all of which have frictional engagement with said shell friction surfaces, said elements being provided with co-acting wedge faces, the co-acting faces of certain of said elements being disposed at relatively blunter angles with reference to the direction of the applied actuating force than the remaining wedge faces of said elements, all of said wedge faces being disposed between the limits of the front and rear ends of each shoe.

10. In a friction shock absorbing mechanism, the combination with a friction shell having interior, converging, friction surfaces; a spring resistance; and an expansible friction unit composed of a plurality of co-acting wedge elements, each provided with a friction face co-acting with a friction surface of said shell, adjacent elements having co-operable sets of engaging wedge faces, at least one of said sets of wedge faces being disposed at a blunter wedging angle than another set, said plurality of co-acting wedge faces being arranged in at least one series, all the wedge faces of which are intersected by a single, transverse plane.

11. In a friction shock absorbing mechanism, the combination with a friction shell having interior, converging, friction surfaces; of a spring resistance; and an expansible friction unit composed of a series of elements each having a friction face co-acting with one of said shell friction surfaces, alternate elements of said series being each provided with a wedge face disposed at a relatively blunt angle with reference to the longitudinal axis of the mechanism and a wedge face disposed at a relatively keen angle to said axis, and the remaining elements of said series having wedge faces co-acting with the wedge faces of said alternate elements.

12. In a friction shock absorbing mechanism, the combination with a friction shell having interior, converging, cylindrical friction surfaces of a spring resistance; and an annular series of friction shoes co-acting with said shell friction surfaces, said series including a shoe having a plurality of keen wedge faces, a second shoe having a plurality of blunt wedge faces, and a pair of shoes each having both keen and blunt wedge faces adapted to co-act with said first named keen and blunt wedge faces.

13. In a friction shock absorbing mechanism, the combination with a friction shell having interior, cylindrical, friction surfaces; of a spring resistance; and a plurality of annular wedge friction shoes co-acting with said shell friction surfaces, said shoes being provided with over-lapping wing portions and inter-engaging wedge faces.

In witness that I claim the foregoing I have hereunto subscribed my name this 3rd day of May 1923.

JOHN F. O'CONNOR.